(12) United States Patent
Sun et al.

(10) Patent No.: US 10,667,324 B2
(45) Date of Patent: May 26, 2020

(54) DETERMINING DTX CAUSE

(71) Applicant: Telefonaktiebolaget LM Ericsson (publ), Stockholm (SE)

(72) Inventors: Ying Sun, Sundbyberg (SE); Anders Johansson, Hässelby (SE); Jing Fu, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 62 days.

(21) Appl. No.: 16/063,046

(22) PCT Filed: Mar. 16, 2016

(86) PCT No.: PCT/SE2016/050214
§ 371 (c)(1),
(2) Date: Jun. 15, 2018

(87) PCT Pub. No.: WO2017/160194
PCT Pub. Date: Sep. 21, 2017

(65) Prior Publication Data
US 2018/0368176 A1    Dec. 20, 2018

(51) Int. Cl.
*H04W 76/28* (2018.01)
*H04L 1/18* (2006.01)
(Continued)

(52) U.S. Cl.
CPC ........... *H04W 76/28* (2018.02); *H04L 1/0027* (2013.01); *H04L 1/1812* (2013.01);
(Continued)

(58) Field of Classification Search
CPC ................ H04W 72/1289–1294; H04W 76/28
See application file for complete search history.

(56) References Cited

U.S. PATENT DOCUMENTS

2017/0019909 A1\* 1/2017 Si ............................. H04L 47/27
2017/0070979 A1\* 3/2017 Mirzaee .................. H04L 1/001
(Continued)

OTHER PUBLICATIONS

Author Unknown, "Technical Specification Group Radio Access Network; Evolved Universal Terrestrial Radio Access (E-UTRA); Physical layer procedures (Release 13)," Technical Specification 36.213, Version 13.0.1, 3GPP Organizational Partners, Jan. 2016, 326 pages.
(Continued)

*Primary Examiner* — Marcus Smith
(74) *Attorney, Agent, or Firm* — Sage Patent Group (57) ABSTRACT

The present disclosure provides a method of determining a DTX cause at an access node, comprising: transmitting, to a User Equipment (UE), an Uplink (UL) grant and a Downlink (DL) assignment in a same DL subframe; detecting whether Discontinuous Transmission (DTX) of at least one of UL data to be transmitted in response to the UL grant received by the UE and Hybrid Automatic Repeat Request (HARQ) Acknowledgement (ACK)/Negative Acknowledgement (NACK) to be transmitted in response to DL data related to the DL assignment received by the UE occurs; and determining a cause of the DTX based on a result of the DTX detection. The present disclosure further provides an access node using the method and a computer program product.

23 Claims, 2 Drawing Sheets

(51) Int. Cl.
*H04L 5/00* (2006.01)
*H04W 72/12* (2009.01)
*H04L 1/00* (2006.01)
*H04L 1/12* (2006.01)

(52) U.S. Cl.
CPC .......... *H04L 1/1861* (2013.01); *H04L 5/0053* (2013.01); *H04L 5/0055* (2013.01); *H04W 72/1289* (2013.01); *H04L 2001/125* (2013.01)

(56) References Cited

U.S. PATENT DOCUMENTS

| | | | | |
|---|---|---|---|---|
| 2018/0139026 A1* | 5/2018 | Ahn | ...................... | H04L 1/1664 |
| 2018/0212717 A1* | 7/2018 | Yang | ........................ | H04L 5/00 |
| 2019/0124688 A1* | 4/2019 | Golitschek Edler Von Elbwart et al. | ........... | H04L 1/00 |

OTHER PUBLICATIONS

Ericsson, "R2-154742: Skipping padding in SPS- and dynamic grants," Third Generation Partnership Project (3GPP), TSG-RAN WG2 #91bis, Oct. 5-9, 2015, 4 pages, Malmo, Sweden.

Huawei et al., "R2-156296: Further analysis on uplink transmission skipping," Third Generation Partnership Project (3GPP), TSG-RAN WG2 #92, Nov. 16-20, 2015, 2 pages, Anaheim, USA.

Samsung, "R1-104576: Need for DAI and HARQ-ACK Transmission Aspects with CA," Third Generation Partnership Project (3GPP), TSG RAN WG1 #62, Aug. 23-28, 2010, 4 pages, Madrid, Spain.

Samsung et al., "R2-157032: Skipping uplink transmission when no data to transmit," Third Generation Partnership Project (3GPP), TSG-RAN WG2 Meeting #92, Change Request 0821, Nov. 16-19, 2015, 3 pages, Anaheim, USA.

Samsung et al., "R2-157033: Skipping uplink transmission when no data to transmit," Third Generation Partnership Project (3GPP), TSG-RAN WG2 Meeting #92, Change Request 1962, Nov. 16-19, 2015, 8 pages, Anaheim, USA.

Timner, Y. et al., "Control Signaling Robustness in LTE," 2009 IEEE 70th Vehicular Technology Conference Fall, IEEE, Sep. 20-23, 2009, Anchorage, USA, 5 pages.

International Search Report and Written Opinion for International Patent Application No. PCT/SE2016/050214, dated Jan. 25, 2017, 18 pages.

* cited by examiner

DETERMINING DTX CAUSE

This application is a 35 U.S.C. § 371 national phase filing of International Application No. PCT/SE2016/050214, filed Mar. 16, 2016, the disclosure of which is incorporated herein by reference in its entirety.

TECHNICAL FIELD

The present disclosure generally relates to the technical field of telecommunication, and particularly to a method of determining a DTX cause and an access node using the method.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In a mobile network such as LTE (Long Term Evolution), there are two main DL (downlink) transmissions on PDCCH (Physical Downlink Control Channel) (e.g. in 3GPP Rel-8/9/10) or on EPDCCH (Enhanced Physical Downlink Control Channel) (e.g. in 3GPP Rel-11):

UL (uplink) grant: a grant to a UE to transmit data on PUSCH (Physical Uplink Shared Channel), which is also referred to as PUSCH grant; and DL assignment: an assignment to the UE that there are DL data available for the UE on PDSCH (Physical Downlink Shared Channel), which is also referred to as PDSCH assignment.

In addition, there are also DL data related to the DL assignment transmitted on PDSCH, which are also referred to as PDSCH data, and could be real payload data to the UE, dummy data, etc.

UE-specific UL grant and DL assignment are, in a DL subframe, signaled independent to each other through PDCCH/EPDCCH.

Correspondingly, there are two main UL transmissions:

UL data: these are data sent by the UE on PUSCH in response to the UL grant, which are also referred to as PUSCH data; and HARQ (Hybrid Automatic Repeat reQuest) ACK/NACK: this is a response sent by the UE to indicate whether the PDSCH data are received by the UE correctly or not.

The HARQ ACK/NACK can be sent on PUCCH (which is also referred to as PUCCH HARQ ACK/NACK) or on PUSCH (which is also referred to as PUSCH HARQ ACK/NACK) where the HARQ ACK/NACK is multiplexed with the PUSCH data. This depends on e.g. whether the UE supports simultaneous PUSCH and PUCCH transmissions (which is a capability of UE that was introduced in 3GPP Rel-10, in which the HARQ ACK/NACK is transmitted on PUCCH only); or whether the PUSCH data are sent in the same UL subframe in a case that the UE does not support the simultaneous PUSCH and PUCCH transmissions; and also depends on whether a skipPadding bit is set for the UE (e.g. in 3GPP Rel-13), which will be discussed later.

In the case that the UE does not support the simultaneous PUSCH and PUCCH transmissions, the HARQ ACK/NACK will be sent on the PUCCH unless there is a coinciding PUSCH transmission in the same UL subframe. In a case that there is a coinciding PUSCH transmission in the same UL subframe, i.e., the UE has received a PUSCH grant (on PDCCH/EPDCCH) for the same UL subframe as for which the HARQ ACK/NACK will be transmitted, the HARQ ACK/NACK will be sent (i.e., multiplexed) together with the PUSCH data on PUSCH resources.

In the case that the UE is configured for supporting the simultaneous PUSCH and PUCCH transmissions, the HARQ ACK/NACK will be sent on the PUCCH.

In LTE, there is about 1% target block error rate for PDCCH/EPDCCH. For comparison, a BLER (Block Error Rate) for PDSCH and PUSCH is typically around 10 times higher, i.e. about 10%, and a probability for missed detection for HARQ ACK/NACK on PUCCH is around 1%. For robustness reasons, the access node, e.g., eNodeB, applies two separate energy detection schemes, i.e., DTX (Discontinuous Transmission) schemes, to find if an UL grant and a DL assignment have been received by the UE, respectively.

For the UL grant, the eNodeB tries to detect an UL signal at allocated PUSCH resources. If there is no UL signal received, e.g. no energy detected at the allocated PUSCH resources, the eNodeB will consider it as a DTX, which may be caused by either the UL grant being not received or erroneously decoded by the UE, or the PUSCH data being transmitted from the UE but not received by the eNodeB. The eNodeB will then schedule an UL grant re-transmission.

For the DL assignment, eNodeB tries to detect the HARQ ACK/NACK transmitted on UL, either on PUCCH or on PUSCH, to determine if the previous DL data are received by the UE. If there is no HARQ ACK/NACK detected on UL at the expected resources where the HARQ ACK/NACK shall transmit, the eNodeB will consider the DL assignment as either not detected or the UL HARQ ACK/NACK as not received. A DL re-transmission will then be scheduled by the eNodeB.

It should be noted that when the HARQ ACK/NACK is multiplexed with the PUSCH data, decoding results for the PUSCH data and the HARQ ACK/NACK multiplexed with the PUSCH data could be different, i.e. the PUSCH data could be correctly decoded while the HARQ ACK/NACK multiplexed with the PUSCH data is erroneously decoded. Since the BLER target for the PUSCH data on PUSCH is around 10% and for the HARQ ACK/NACK multiplexed with the PUSCH data is around 1%, it is actually the reversed results that are more likely, e.g. PUSCH data are erroneously received and the HARQ ACK/NACK multiplexed with the PUSCH data is correctly decoded.

For the DL assignment case, there are two types of errors that could cause DTX:

1) the PDCCH/EPDCCH is not received correctly or erroneously decoded by the UE, or 2a) the HARQ ACK/NACK from the UE to the eNodeB is lost for some reason.

For the UL grant case, there are similarly two types of errors causing DTX:

1) the PDCCH/EPDCCH is not received correctly or erroneously decoded by the UE, or 2b) the PUSCH data from the UE to the eNodeB is lost for some reason.

For eNodeB, it is very important to distinguish between these two DTX cases, e.g. with respect to Link Adaptation, since the first DTX case 1) belongs to a DL problem, while the second DTX cases 2a) and 2b) belong to an UL problem.

As previously described, in 3GPP Rel-13, a skip-padding-in-uplink alternative is introduced (which is disclosed in e.g. R2-156296, R2-157032, R2-157033 available from http:// www.3gpp.org/). When the "skipPadding" bit is set and signaled to the UE (which is also referred to as "skipPadding UE") through a RRC signaling or on a separate dynamic grant, the UE is allowed to not transmit at all if there is no data in an UL buffer. However, the UE in previous 3GPP releases (which is also referred to as "legacy UE", in order to be distinguished from the skipPadding UE in e.g. 3GPP Rel-13) was obliged to transmit on granted PUSCH resources even when it had not enough data in the UL buffer of the UE; and then the UE transmitted padding data. Hereinafter, "UE" is used for referring to either the legacy UE or the skipPadding UE, unless otherwise indicated.

Thus, when such a new skipPadding option is used, the eNodeB cannot know if the DTX on PUSCH is due to a third DTX case:

3) no data in a buffer of the skipPadding UE ("true DTX"), or if the DTX is due to one of the previous two types of DTX cases. It should be noted that this third case 3), i.e. no data in the UE buffer, is not an error case, but rather a "true DTX" case.

This third DTX case is only applicable to the UL grant.

There may be problems with the existing technical solutions in which the UL grant and the DL assignment are signaled independent to each other on PDCCH/EPDCCH.

For example, when the eNodeB transmits only the UL grant or only the DL assignment to the UE on PDCCH/EPDCCH and gets no feedback from the UE, i.e., detects a DTX, it is impossible for the eNodeB to determine whether the DTX is caused by a DL problem (e.g. UL grant or DL assignment on PDCCH/EPDCCH being erroneously decoded or being not received by the UE) or by an UL problem (e.g. PUSCH data or HARQ ACK/NACK being lost), which disadvantageously affects DTX robustness.

Especially for the skipPadding UE, there is an additional DTX case that cannot be differentiated by the eNodeB from the two DTX cases for legacy implementations. This causes problems for the eNodeB e.g. w.r.t. link adaptation when it is not known if a PDSCH was transmitted or not.

Furthermore, with independent UL grant and DL assignment transmissions on PDCCH/EPDCCH, the UE might require at least two separate PDCCH/EPDCCH physical resources, at least one for UL and at least one for DL scheduling, simultaneously. Thus, there is a waste of the PDCCH/EPDCCH resources, which causes PDCCH/EPDCCH resource utilization inefficiency. This is extremely important in NX (Next generation), where simultaneous UL and DL transmissions in the same subframe is more frequent.

Therefore, a technical solution of enabling the eNodeB to differentiate whether a DTX is caused by a DL problem (UL grant or DL assignment on PDCCH/EPDCCH being erroneously decoded or being not received by the UE) or by an UL problem (e.g. PUSCH data or HARQ ACK/NACK being lost) is desired so as to improve DTX robustness.

SUMMARY

Accordingly, an object of the present disclosure is to provide an improved DTX robustness scheme, in which both UL grant and DL assignment are transmitted to the UE in a same DL subframe, so that combined feedback information related to UL data (to be transmitted in response to the UL grant) and the HARQ ACK/NACK (to be transmitted in response to the DL data related to the DL assignment) can be received by an access node from the UE in order to improve the DTX robustness scheme in the access node with a combined energy detection result for UL data and HARQ ACK/NACK.

According to one aspect of the present disclosure, a method at an access node is provided. The method comprises: transmitting, to a UE, an UL grant and a DL assignment in a same DL subframe; detecting whether DTX of at least one of (1) UL data to be transmitted in response to the UL grant received by the UE and (2) HARQ ACK/NACK to be transmitted in response to DL data related to the DL assignment received by the UE occurs; and determining a cause of the DTX based on a result of the DTX detection.

In an embodiment of the method, the method further comprises:

taking a corresponding action in regard of the UL and/or DL based on the determined cause of the DTX In an embodiment of the method, in a case that the UE supports simultaneous transmissions on an UL shared channel and on an UL control channel, the UL shared channel allows transmission of the UL data and the UL control channel allows transmission of the HARQ ACK/NACK.

In an embodiment of the method, the step of determining comprises: responsive to detecting that the DTX of both the UL data and the HARQ ACK/NACK occurs, determining that the DTX is caused by a DL problem in which neither the UL grant nor the DL assignment transmitted in the same DL subframe is detected by the UE; responsive to detecting that the DTX of only the UL data occurs, determining that the DTX is caused by a UL problem in which the UL shared channel is too weak; responsive to detecting that the DTX of only the HARQ ACK/NACK occurs, determining that the DTX is caused by a UL problem in which the UL control channel is too weak.

In an embodiment of the method, in a case that the UE is allowed to not transmit padding data if there is no data in an UL buffer, the step of determining comprises: responsive to detecting that the DTX of both the UL data and the HARQ ACK/NACK occurs, determining that the DTX is caused by a DL problem in which neither the UL grant nor the DL assignment transmitted in the same DL subframe is detected by the UE; responsive to detecting that the DTX of only the UL data occurs, determining that the DTX is caused due to no data in the UL buffer to be transmitted by the UE or the UL shared channel is too weak; responsive to detecting that the DTX of only the HARQ ACK/NACK occurs, determining that the DTX is caused by a UL problem in which the UL control channel is too weak.

In an embodiment of the method, in a case that the UE does not support simultaneous transmissions on an UL shared channel and on an UL control channel, the UL shared channel allows transmission of the UL data; the HARQ ACK/NACK is allowed to be transmitted on the UL shared channel by multiplexing with the UL data if there are data to be transmitted on the UL shared channel, and the HARQ ACK/NACK is allowed to be transmitted on the UL control channel if there is no data to be transmitted on the UL shared channel.

In an embodiment of the method, in a case that the UE is allowed to not transmit padding data if there is no data in an UL buffer, the step of determining comprises: responsive to detecting that the DTX of the UL data and the HARQ ACK/NACK on both the UL shared channel and the UL control channel occurs, determining that the DTX is caused by a DL problem in which neither the UL grant nor the DL assignment transmitted in the same DL subframe is detected by the UE; responsive to detecting that the DTX of both the UL data and the HARQ ACK/NACK on the UL shared channel occurs, determining that the DTX is caused due to no data in the UL buffer to be transmitted by the UE; responsive to detecting that the DTX of the HARQ ACK/NACK on both the UL shared channel and the UL control channel occurs, determining that the DTX is caused by a UL problem in which the UL shared channel is too weak.

In an embodiment of the method, the UL grant and the DL assignment are transmitted to the UE on DL physical resources which experience substantially identical channel conditions.

In an embodiment of the method, the UL grant and the DL assignment are transmitted to the UE on same DL physical resources.

According to another aspect of the present disclosure, an access node is provided. The access node comprises: a transceiver, configured to transmit, to a UE, an UL grant and a DL assignment in a same DL subframe; a detection unit, configured to detect whether DTX of at least one of (1) UL data to be transmitted in response to the UL grant received by the UE and (2) HARQ ACK/NACK to be transmitted in response to DL data related to the DL assignment received by the UE occurs; and a determination unit, configured to determine a cause of the DTX based on a result of the DTX detection.

In an embodiment of the access node, the access node further comprises a processing unit, configured to take a corresponding action in regard of the UL and/or DL based on the determined cause of the DTX In an embodiment of the access node, in a case that the UE supports simultaneous transmissions on an UL shared channel and on an UL control channel, the UL shared channel allows transmission of the UL data and the UL control channel allows transmission of the HARQ ACK/NACK.

In an embodiment of the access node, the determination unit is configured to: responsive to detecting, by the detection unit, that the DTX of both the UL data and the HARQ ACK/NACK occurs, determine that the DTX is caused by a DL problem in which neither the UL grant nor the DL assignment transmitted in the same DL subframe is detected by the UE; responsive to detecting, by the detection unit, that the DTX of only the UL data occurs, determine that the DTX is caused by a UL problem in which the UL shared channel is too weak; responsive to detecting, by the detection unit, that the DTX of only the HARQ ACK/NACK occurs, determine that the DTX is caused by a UL problem in which the UL control channel is too weak.

In an embodiment of the access node, in a case that the UE is allowed to not transmit padding data if there is no data in an UL buffer, the determination unit is configured to: responsive to detecting, by the detection unit, that the DTX of both the UL data and the HARQ ACK/NACK occurs, determine that the DTX is caused by a DL problem in which neither the UL grant nor the DL assignment transmitted in the same DL subframe is detected by the UE; responsive to detecting, by the detection unit, that the DTX of only the UL data occurs, determine that the DTX is caused due to no data in the UL buffer to be transmitted by the UE or the UL shared channel is too weak; responsive to detecting, by the detection unit, that the DTX of only the HARQ ACK/NACK occurs, determine that the DTX is caused by a UL problem in which the UL control channel is too weak. In an embodiment of the access node, in a case that the UE does not support simultaneous transmissions on an UL shared channel and on an UL control channel, the UL shared channel allows transmission of the UL data; the HARQ ACK/NACK is allowed to be transmitted on the UL shared channel by multiplexing with the UL data if there are data to be transmitted on the UL shared channel, and the HARQ ACK/NACK is allowed to be transmitted on the UL control channel if there is no data to be transmitted on the UL shared channel.

In an embodiment of the access node, in a case that the UE is allowed to not transmit padding data if there is no data in an UL buffer, the determination unit is configured to: responsive to detecting, by the detection unit, that the DTX of the UL data and the HARQ ACK/NACK on both the UL shared channel and the UL control channel occurs, determine that the DTX is caused by a DL problem in which neither the UL grant nor the DL assignment transmitted in the same DL subframe is detected by the UE; responsive to detecting, by the detection unit, that the DTX of both the UL data and the HARQ ACK/NACK on the UL shared channel occurs, determine that the DTX is caused due to no data in the UL buffer to be transmitted by the UE; responsive to detecting, by the detection unit, that the DTX of the HARQ ACK/NACK on both the UL shared channel and the UL control channel occurs, determine that the DTX is caused by a UL problem in which the UL shared channel is too weak.

In an embodiment of the access node, the UL grant and the DL assignment are transmitted to the UE on DL physical resources which experience substantially identical channel conditions.

In an embodiment of the access node, the UL grant and the DL assignment are transmitted to the UE on same DL physical resources.

According to another aspect of the present disclosure, an access node is provided. The access node comprises: a communication interface arranged for wireless communication, at least one processor, and a memory including instructions which, when executed by said at least one processor, cause said access node to: transmit, via the communication interface, to a UE, an UL grant and a DL assignment in a same DL subframe; detect whether DTX of at least one of (1) UL data to be transmitted in response to the UL grant received by the UE and (2) HARQ ACK/NACK to be transmitted in response to DL data related to the DL assignment received by the UE occurs; and determine a cause of the DTX based on a result of the DTX detection.

In an embodiment of the access node, wherein the memory further includes instructions which, when executed by said at least one processor), cause said access node to: take a corresponding action in regard of the UL and/or DL based on the determined cause of the DTX.

In an embodiment of the access node, in a case that the UE supports simultaneous transmissions on an UL shared channel and on an UL control channel, the UL shared channel allows transmission of the UL data and the UL control channel allows transmission of the HARQ ACK/NACK.

In an embodiment of the access node, the memory further includes instructions which, when executed by said at least one processor, cause the access node to: responsive to detecting that the DTX of both the UL data and the HARQ ACK/NACK occurs, determine that the DTX is caused by a DL problem in which neither the UL grant nor the DL assignment transmitted in the same DL subframe is detected by the UE; responsive to detecting that the DTX of only the UL data occurs, determine that the DTX is caused by a UL problem in which the UL shared channel is too weak; responsive to detecting that the DTX of only the HARQ ACK/NACK occurs, determine that the DTX is caused by a UL problem in which the UL control channel is too weak.

In an embodiment of the access node, the memory further includes instructions which, when executed by said at least one processor, cause the access node to: in a case that the UE is allowed to not transmit padding data if there is no data in an UL buffer, the determination unit is configured to: responsive to detecting that the DTX of both the UL data and the HARQ ACK/NACK occurs, determine that the DTX is caused by a DL problem in which neither the UL grant nor the DL assignment transmitted in the same DL subframe is detected by the UE; responsive to detecting that the DTX of only the UL data occurs, determine that the DTX is caused due to no data in the UL buffer to be transmitted by the UE or the UL shared channel is too weak; responsive to detecting that the DTX of only the HARQ ACK/NACK occurs, determine that the DTX is caused by a UL problem in which the UL control channel is too weak.

In an embodiment of the access node, in a case that the UE does not support simultaneous transmissions on an UL shared channel and on an UL control channel, the UL shared channel allows transmission of the UL data; the HARQ ACK/NACK is allowed to be transmitted on the UL shared channel by multiplexing with the UL data if there are data to be transmitted on the UL shared channel, and the HARQ ACK/NACK is allowed to be transmitted on the UL control channel if there is no data to be transmitted on the UL shared channel.

In an embodiment of the access node, in a case that the UE is allowed to not transmit padding data if there is no data in an UL buffer, the memory further includes instructions which, when executed by said at least one processor, cause the access node to: responsive to detecting that the DTX of the UL data and the HARQ ACK/NACK on both the UL shared channel and the UL control channel occurs, determine that the DTX is caused by a DL problem in which neither the UL grant nor the DL assignment transmitted in the same DL subframe is detected by the UE; responsive to detecting that the DTX of both the UL data and the HARQ ACK/NACK on the UL shared channel occurs, determine that the DTX is caused due to no data in the UL buffer to be transmitted by the UE; responsive to detecting that the DTX of the HARQ ACK/NACK on both the UL shared channel and the UL control channel occurs, determine that the DTX is caused by a UL problem in which the UL shared channel is too weak.

In an embodiment of the access node, the UL grant and the DL assignment are transmitted to the UE on DL physical resources which experience substantially identical channel conditions.

In an embodiment of the access node, the UL grant and the DL assignment are transmitted to the UE on same DL physical resources.

In an embodiment of the access node, the access node is an eNodeB.

According to another aspect of the present disclosure, a computer program is provided. The computer program comprising instructions that when executed, cause one or more computing devices to perform the methods as previously described.

According to another aspect of the present disclosure, a computer program product is provided. The computer program product comprises a computer-readable medium storing instructions that when executed, cause one or more computing devices to perform the methods as previously described.

The technical solutions of the present disclosure may at least have beneficial effects as follows.

By transmitting both the UL grant and the DL assignment the UE in the same DL subframe, combined feedback information related to the UL data to be transmitted in response to the UL grant and the HARQ ACK/NACK to be transmitted in response to the DL data related to the DL assignment can be received by the access node from the UE, so as to improve the DTX robustness scheme in the conventional technical solutions in which the UL grant and the DL assignment are signaled independent to each other and only feedback information related to either the UL data or the HARQ ACK/NACK can be received.

Additionally, if the UL grant and the DL assignment are transmitted on separate DL physical resources, the DL physical resources for the UL grant and the DL physical resources for the DL assignment may require separate two CRCs (Cycle Redundancy Check), which may cause the DL physical resource utilization inefficiency. By transmitting both the UL grant and the DL assignment the UE on the same DL physical resources, the DL control channel, e.g. PDCCH/EPDCCH, physical resources may be saved by saving some coded DCI (DL Control Information) bits (e.g. only one CRC required and 16 bits saved), compared to the case in which the UL grant and the DL assignment are signaled on separate DL physical resources.

BRIEF DESCRIPTION OF THE DRAWINGS

The objects, advantages and characteristics of the present disclosure will be more apparent, according to descriptions of preferred embodiments in connection with the drawings, on which.

It should be noted that various parts in the drawings are not drawn to scale, but only for an illustrative purpose, and thus should not be understood as any limitations and constraints on the scope of the present disclosure.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The techniques described herein may be used for various wireless communication networks such as CDMA, TDMA, FDMA, OFDMA, SC-FDMA and other networks. The terms "network" and "system" are often used interchangeably. The techniques described herein may be used for the wireless networks and radio technologies mentioned herein as well as other wireless networks and radio technologies proposed in the future. For clarity, certain aspects of the techniques are described below for LTE, and LTE terminology is used in much of the description below.

It will be appreciated that "access node" used herein refer to any of entities capable of accessing to any of wireless communication networks. For example, the access node may comprise a NodeB, eNodeB etc.

The basic principle of the present disclosure consists in:
a combined UL grant and DL assignment transmission on DL, in which the access node transmits the UL grant and the DL assignment to the UE in the same DL subframe; and a combined energy detection scheme on UL, which is applied by the access node to combined feedback information related to the UL data (to be transmitted from the UE in response to the UL grant) and the HARQ ACK/NACK (to be transmitted from the UE in response to the DL data related to the DL assignment).

As such, the DTX robustness scheme based on results of the combined energy detection scheme in the access node can be improved to further determine a cause of DTX, i.e., whether the DTX is caused by a UL problem or a DL problem.

Hereinafter, a flowchart of a DTX robustness method for determining a DTX cause according to an embodiment of the present disclosure will be described with reference to FIG. 1.

Figure 1:
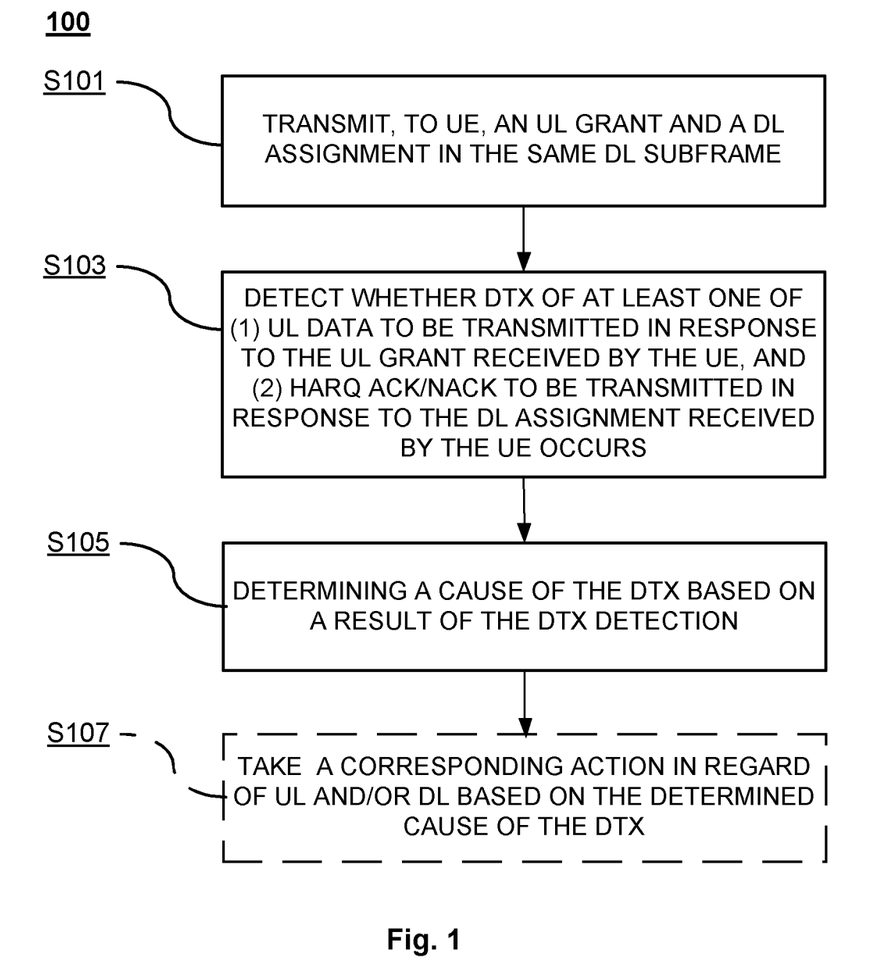
FIG. 1 illustratively shows a flowchart of a method of determining a DTX cause according to an embodiment of the present disclosure.

As seen from FIG. 1, the method 100 may comprise steps S101 to S105, in which step S101 occurs on DL, and steps S103 and S105 occur on UL.

In step S101, the UL grant and the DL assignment are transmitted by the access node to the UE in the same DL subframe.

The UL grant and the DL assignment transmitted in the same DL subframe may exhibit more similar DL channel characteristics and code rates, and thus may achieve more similar error probabilities for the UE to decode the UL grant and the DL assignment, which can be regarded as "substantially identical" and thus can be not taken into account in the DTX cause determination of the present disclosure.

It is preferable that the DL assignment and the UL grant are decoded by the UE with substantially equal error probabilities. The more "equal" the error probabilities for the DL assignment and the UL grant are, the better the confidence in the method 100 (i.e., the DTX robustness scheme) would be.

Assuming that the DL assignment and the UL grant may be decoded by the UE with substantially equal error probabilities, it can be determined that either both of the DL assignment and the UL grant are correctly received by the UE, or neither of the DL assignment and the UL grant is correctly received by the UE. From the UE transmissions (HARQ ACK/NACK and UL data), an improved DTX robustness handling in the access node thus can be obtained.

However, it should be appreciated that the method 100 may also be applied to a case where the DL assignment and the UL grant are decoded by the UE with unequal error probabilities, e.g. 1% versus 10%, as long as the error probabilities are known. In this case, the method 100 needs to take the unequal error probabilities into account.

Herein, in order not to obscure the principle of the present disclosure, it is assumed that the DL assignment and the UL grant are decoded by the UE with substantially equal error probabilities for better illustration of the idea of the present disclosure.

There are many ways to achieve the equal error probabilities for the DL assignment and the UL grant. For example, the equal error probabilities may be achieved by transmitting the UL grant and the DL assignment in the same DL subframe as described above so that the DL assignment and the UL grant have the same code rates and the same channel characteristics. Other ways are possible, e.g., if the DL assignment has a much better channel than the UL grant, it is possible to set a lower higher code rate for the UL grant to compensate for the worse channel, and still get equal error probabilities for the two DL control channels (e.g. PDCCHs/ EPDCCHs). It will be understood by the skilled in the art that the way of achieving the equal error probabilities for the DL assignment and the UL grant is not limited by the above exemplary illustration.

As previously discussed, in this embodiment, the UL grant and the DL assignment are transmitted by the access node to the UE in the same DL subframe, which may have substantially identical DL channel characteristics and substantially identical code rates to achieve substantially equal error probabilities for the UE to decode the UL grant and the DL assignment for better determining the DTX cause subsequently.

In another embodiment, the UL grant and the DL assignment may be transmitted to the UE on DL physical resources which experience substantially identical channel conditions. Here, "substantially identical" means, e.g., that the DL physical resources are so close in time and frequency that—considering an expected channel variation rate—any difference in channel conditions is too small to reasonably explain why a transmission in one DL physical resource succeeds and a transmission in the other DL physical resource fails. That is, given the expected channel variation rate, the DL physical resources are sufficiently close so that if they differ with respect to transmit success/transmit failure, this is NOT attributable to the channel variation. For example, the UL grant may be allocated to one PDCCH/ EPDCCH and the DL assignment may be allocated to another PDCCH/EPDCCH; and the two PDCCHs/EPDCCHs are preferably assigned as close as possible to each other in the DL time-frequency domain, such that they will experience "substantially identical" DL channel conditions. In the present embodiment, the equal error probabilities for the DL assignment and the UL grant are generally less affected by the channel variation and are closer to each other than the embodiment in which the UL grant and the DL assignment is transmitted in the same DL subframe.

For the UE that supports PDCCH, the access node may allocate PDCCH CCEs (Control Channel Element) for the UL grant and the DL assignment in the PDCCH locations which experience substantially identical channel conditions. This ensures that the PDCCH transmissions of the UL grant and the DL assignment are subject to the substantial identical DL channel conditions. According to 3GPP design, the PDCCH transmissions of the UL grant and the DL assignment are spread over the entire DL system bandwidth and over all OFDM symbols used for control data (typically 1 to 3 OFDM symbols). This implies that the PDCCH transmissions of the UL grant and the DL assignment will have similar DL channels.

For the UE that supports EPDCCH, since the EPDCCHs are transmitted on different PRBs (Physical Resource Block) especially assigned for EPDCCH, the access node can, at least to some degree, control if the EPDCCHs are sent on the same PRBs or not. Thus, in this case, the EPDCCHs for transmitting the UL grant and the DL assignment shall be assigned on the same PRB pairs, and the access node may allocate EPDCCH ECCEs (Enhanced Control Channel Element) for the UL grant and the DL assignment in the same PRB pair(s).

In yet another embodiment, the UL grant and the DL assignment may be transmitted to the UE on the same DL physical resources, which would require the UL grant and the DL assignment to be jointly coded. In the present embodiment, the equal error probabilities for the DL assignment and the UL grant are generally even less affected by the channel variation and are closer to each other than the previous two embodiments. Actually, the UL grant and the DL assignment transmitted on the same DL physical resources would get exactly the same error probability. Furthermore, since the UL grant and the DL assignment transmitted on the same DL physical resources are jointly coded, at each transmission, the coding result for both of the UL grant and the DL assignment would be the same, i.e. both are correctly decoded (i.e., CRC ok) or both are incorrectly decoded (i.e., CRC not ok).

As previously mentioned, the UE in the above embodiments may be a legacy UE or a skipPadding UE. The only difference for the skipPadding UE from the legacy UE consists in that there will be no transmission on the UL shared channel (e.g. PUSCH), if there are no data in the UL buffer.

The method 100 may be applied to a future UE as well. For the future UE, the DL physical resources with a larger size but containing both the UL grant and the DL assignment in a combined DCI format may be allocated.

There are two main UL transmissions:
UL data: these are data sent by the UE on the UL shared channel (e.g. PUSCH) in response to the UL grant; and
HARQ ACK/NACK: this is a response sent by the UE to indicate whether the data on the DL shared channel (e.g. PDCCH) are received by the UE correctly or not.

In the present disclosure, if the UL grant and the DL assignment are transmitted in the same DL subframe, the UL data and the HARQ ACK/NACK will be located in the same UL subframe.

In step S103, the access node detects whether DTX of at least one of (1) UL data to be transmitted in response to the UL grant received by the UE and (2) HARQ ACK/NACK to be transmitted in response to DL data related to the DL assignment received by the UE occurs. And in step S105, the access node determines a cause of the DTX based on a result of the DTX detection.

As previously mentioned, simultaneous transmissions on an UL shared channel (e.g. PUSCH) and on an UL control channel (e.g. PUCCH) is a capability of UE that was introduced in 3GPP Rel-10, in which the HARQ ACK/NACK is transmitted on the UL control channel (e.g. PUCCH) only.

In an embodiment, in a case that the UE supports the simultaneous transmissions on an UL shared channel and on an UL control channel, e.g., the UE is configured for simultaneous PUSCH and PUCCH transmissions, the UL shared channel (e.g. PUSCH) allows transmission of the UL data and the UL control channel (e.g. PUCCH) allows transmission of the HARQ ACK/NACK. In this case, if the UE is a legacy UE which was obliged to transmit on granted UL shared channel even when it had not enough data in the UL buffer of the UE where padding data are transmitted, the access node makes determinations in step S105 of:

A) responsive to detecting in step S103 that the DTX of both the UL data and the HARQ ACK/NACK occurs, determining in step S105 that the DTX is caused by a DL problem in which neither the UL grant nor the DL assignment transmitted in the same DL subframe is detected by the UE;

B) responsive to detecting in step S103 that the DTX of only the UL data occurs, determining in step S105 that the DTX is caused by a UL problem in which the UL shared channel is too weak;

C) responsive to detecting in step S103 that the DTX of only the HARQ ACK/NACK occurs, determining in step S105 that the DTX is caused by a UL problem in which the UL control channel is too weak.

Accordingly, the method 100 may comprise a step S107, in which the access node may take a corresponding action in regard of the UL and/or DL based on the cause of the DTX determined in step S105, in order to implement the improved DTX robustness scheme.

Relationships between combined DTX detection results obtained in step S103 and DTX causes determined in step S105 as well as actions suggested to be performed in step S107 are outlined in Table 1 as presented below.

TABLE 1

| UL Data | HARQ ACK/NACK On UL Shared Channel | HARQ ACK/NACK On UL Control Channel | DTX Cause and Suggested Action | Note |
|---|---|---|---|---|
| DTX | DTX | DTX | Probable Cause: UL grant is missing. Suggested Action: Retransmission without toggling NDI (New Data Indication) and without stepping RVI (Redundancy Version Indicator). | A |
| DTX | DTX | Not DTX | Probable Cause: UE has received UL grant but UL shared channel is too weak. Suggested Action: Both non-adaptive retransmission and adaptive retransmission with separate grant on UL is possible. When retransmission grant is issued, step RVI to obtain redundancy version incremental gain. | B |
| DTX | Not DTX | DTX | Not a possible outcome since DTX of UL data will always cause DTX of HARQ ACK/NACK On UL Shared Channel. | X |
| DTX | Not DTX | Not DTX | Not a possible outcome since DTX of UL data will always cause DTX of HARQ ACK/NACK On UL Shared Channel. | X |
| Not DTX | DTX | DTX | Probable Cause: UL Control Channel is too weak. Suggested Action: Increase power of UL Control Channel. | C |

TABLE 1-continued

| UL Data | HARQ ACK/NACK On UL Shared Channel | HARQ ACK/NACK On UL Control Channel | DTX Cause and Suggested Action | Note |
|---|---|---|---|---|
| Not DTX | DTX | Not DTX | Probable Cause: all channels are good. Suggested Action: No action | |
| Not DTX | Not DTX | DTX | Not a possible outcome since the HARQ ACK/NACK will be transmitted on UL Control Channel. | X |
| Not DTX | Not DTX | Not DTX | Not a possible outcome since the HARQ ACK/NACK will be transmitted on UL Control Channel. | X |

As seen from Table 1, "A", "B" and "C" in the "Note" column refer to the three outcomes A), B) and C) respectively in the case that UE supports the simultaneous transmissions on an UL shared channel and on an UL control channel and is a legacy UE which was obliged to transmit on granted UL shared channel even when it had not enough data in the UL buffer of the UE where padding data are transmitted, as previously described. "X" in the "Note" column refers to outcomes which are not possible, and reasons are given in corresponding "DTX Cause and Suggested Action" columns in italics. Items in the "HARQ ACK/NACK On UL Shared Channel" column in bold italics represent non-valid HARQ ACK/NACK mapping to UL Shared Channel, since simultaneous transmissions on UL shared channel and on UL control channel are assumed.

Since any HARQ ACK/NACK should always be transmitted on the UL control channel in the case of simultaneous transmissions on UL shared channel and on UL control channel, there is no HARQ ACK/NACK decoding required on the UL shared channel in this case, i.e., the "HARQ ACK/NACK On UL Shared Channel" column is not required to be considered in the present embodiment.

It should be noted that the present disclosure focuses on determining, by the access node, the cause of DTX precisely based on the combined feedback information related to UL data and the HARQ ACK/NACK. Based on the above principle of the present disclosure, the access node may take a more appropriate action to improve the DTX case. Although Suggested Actions as performed in step S107 are listed in Table 1 (as well as in Tables 2 and 3 to be described later), it will be understood by the skilled in the art that they are only examples of actions to be taken by the access node to improve the DTX case. However, the skilled in the art may contemplate any actions which can be taken by the access node to improve the DTX case in practice, all of which are within the scope of the present disclosure. That is, step S107 does not constitute a part of the principle of the present disclosure and is not essential to the present disclosure.

In another embodiment, in a case that the UE supports the simultaneous transmissions on an UL shared channel and on an UL control channel, e.g., the UE is configured for simultaneous PUSCH and PUCCH transmissions, the UL shared channel (e.g. PUSCH) allows transmission of the UL data and the UL control channel (e.g. PUCCH) allows transmission of the HARQ ACK/NACK. Further, in a case that the UE is allowed to not transmit padding data if there is no data in an UL buffer, i.e., the UE is a skipPadding UE as previously mentioned for which a skipPadding bit is set, the access node performs operations of:

A') responsive to detecting in step S103 that the DTX of both the UL data and the HARQ ACK/NACK occurs, determining in step S105 that the DTX is caused by a DL problem in which neither the UL grant nor the DL assignment transmitted in the same DL subframe is detected by the UE;

D) responsive to detecting in step S103 that the DTX of only the UL data occurs, determining in step S105 that the DTX is caused due to no data in the UL buffer to be transmitted by the UE or the UL shared channel is too weak;

C') responsive to detecting in step S103 that the DTX of only the HARQ ACK/NACK occurs, determining in step S105 that the DTX is caused by a UL problem in which the UL control channel is too weak.

Accordingly, the method 100 may comprise the step S107, in which the access node may take a corresponding action in regard of the UL and/or DL based on the cause of the DTX determined in step S105, in order to implement the improved DTX robustness.

Relationships between combined DTX detection results obtained in step S103 and DTX causes determined in step S105 as well as actions suggested to be performed in step S107 are outlined in Table 2 as presented below.

TABLE 2

| UL Data | HARQ ACK/NACK On UL Shared Channel | HARQ ACK/NACK On UL Control Channel | DTX Cause and Suggested Action | Note |
|---|---|---|---|---|
| DTX | DTX | DTX | Probable Cause: UL grant is missing. Suggested Action: Retransmission without toggling NDI and without stepping RVI. | A' |

TABLE 2-continued

| UL Data | HARQ ACK/NACK On UL Shared Channel | HARQ ACK/NACK On UL Control Channel | DTX Cause and Suggested Action | Note |
|---|---|---|---|---|
| DTX | DTX | Not DTX | Probable Cause: UE has received UL grant but UL shared channel is too weak. Suggested Action: Both non-adaptive retransmission and adaptive retransmission with separate grant on UL is possible. When retransmission grant is issued, step RVI to obtain redundancy version incremental gain. Or Probable Cause: No data in UL buffer, i.e. no padding data and no UL data transmitted. Suggested action: No retransmission is needed. | D |
| DTX | Not DTX | DTX | Not a possible outcome since DTX of UL data will always cause DTX of HARQ ACK/NACK On UL Shared Channel. | X |
| DTX | Not DTX | Not DTX | Not a possible outcome since DTX of UL data will always cause DTX of HARQ ACK/NACK On UL Shared Channel. | X |
| Not DTX | DTX | DTX | Probable Cause: UL Control Channel is too weak. Suggested Action: Increase power of UL Control Channel. | C' |
| Not DTX | DTX | Not DTX | Probable Cause: all channels are good. Suggested Action: No action | |
| Not DTX | Not DTX | DTX | Not a possible outcome since the HARQ ACK/NACK will be transmitted on UL Control Channel. | X |
| Not DTX | Not DTX | Not DTX | Not a possible outcome since the HARQ ACK/NACK will be transmitted on UL Control Channel. | X |

As seen from Table 2, "A'", "D" and "C'" in the "Note" column refer to the three outcomes A'), D) and C') respectively in the case that UE supports the simultaneous transmissions on an UL shared channel and on an UL control channel and is allowed to not transmit padding data if there is no data in an UL buffer, as previously described. "X" in the "Note" column refers to outcomes which are not possible, and reasons are given in corresponding "DTX Cause and Suggested Action" columns in italics. Items in the "HARQ ACK/NACK On UL Shared Channel" column in bold italics represent non-valid HARQ ACK/NACK mapping to UL Shared Channel, since simultaneous transmissions on UL shared channel and on UL control channel are assumed.

Since any HARQ ACK/NACK should always be transmitted on the UL control channel in the case of simultaneous transmissions on UL shared channel and on UL control channel, there is no HARQ ACK/NACK decoding required on the UL shared channel in this case, i.e., the "HARQ ACK/NACK On UL Shared Channel" column is not required to be considered in the present embodiment.

In yet another embodiment, in a case that the UE does not support the simultaneous transmissions on an UL shared channel and on an UL control channel, e.g., the UE is not configured for simultaneous PUSCH and PUCCH transmissions, the UL shared channel allows transmission of the UL data; the HARQ ACK/NACK is allowed to be transmitted on the UL shared channel by multiplexing with the UL data if there are data to be transmitted on the UL shared channel, and the HARQ ACK/NACK is allowed to be transmitted on the UL control channel if there is no data to be transmitted on the UL shared channel. Further, in a case that the UE is allowed to not transmit padding data if there is no data in the UL buffer, i.e., the UE is the skipPadding UE, the access node performs operations of:

E) responsive to detecting in step S103 that the DTX of the UL data and the HARQ ACK/NACK on both the UL shared channel and the UL control channel occurs, determining in step S105 that the DTX is caused by a DL problem in which neither the UL grant nor the DL assignment transmitted in the same DL subframe is detected by the UE;

F) responsive to detecting in step S103 that the DTX of both the UL data and the HARQ ACK/NACK on the UL shared channel occurs, determining in step S105 that the DTX is caused due to no data in the UL buffer to be transmitted by the UE;

G) responsive to detecting in step S103 that the DTX of the HARQ ACK/NACK on both the UL shared channel and the UL control channel occurs, determining in step S105 that the DTX is caused by a UL problem in which the UL shared channel is too weak.

Accordingly, the method 100 may comprise the step S107, in which the access node may take a corresponding action in regard of the UL and/or DL based on the cause of the DTX determined in step S105.

Relationships between combined DTX detection results obtained in step S103 and DTX causes determined in step S105 as well as actions suggested to be performed in step S107 are outlined in Table 3 as presented below.

TABLE 3

| UL Data | HARQ ACK/NACK On UL Shared Channel | HARQ ACK/NACK On UL Control Channel | DTX Cause and Suggested Action | Note |
|---|---|---|---|---|
| DTX | DTX | DTX | Probable Cause: UL grant is missing. Suggested Action: Retransmission without toggling NDI and without stepping RVI. | E |
| DTX | DTX | Not DTX | Probable Cause: No data in UL buffer, i.e. no padding data and no UL data transmitted. Suggested action: No retransmission is needed. | F |
| DTX | Not DTX | DTX | Not a possible outcome since DTX of UL data will always cause DTX of HARQ ACK/NACK On UL Shared Channel. | X |
| DTX | Not DTX | Not DTX | Not a possible outcome since DTX of UL data will always cause DTX of HARQ ACK/NACK On UL Shared Channel. | X |
| Not DTX | DTX | DTX | Probable Cause: UL Shared Channel is too weak. Suggested Action: Increase power of UL Shared Channel. | G |
| Not DTX | DTX | Not DTX | Not a possible outcome since the HARQ ACK/NACK will be multiplexed with UL data on UL Shared Channel. | X |
| Not DTX | Not DTX | DTX | Probable Cause: all channels are good. Suggested Action: No action | |
| Not DTX | Not DTX | Not DTX | Not a possible outcome since the HARQ ACK/NACK will be multiplexed with UL data on UL Shared Channel. | X |

As seen from Table 1, "E", "F" and "G" in the "Note" column refer to the three outcomes E), F) and G) respectively in the case that UE does not support the simultaneous transmissions on an UL shared channel and on an UL control channel and is allowed to not transmit padding data if there is no data in an UL buffer, as previously described. "X" in the "Note" column refers to outcomes which are not possible, and reasons are given in corresponding "DTX Cause and Suggested Action" columns in italics. Items in the "HARQ ACK/NACK On UL Shared Channel" column in bold italics represent non-valid HARQ ACK/NACK mapping to UL Control Channel, since simultaneous transmissions on UL shared channel and on UL control channel are not assumed.

Figure 2:
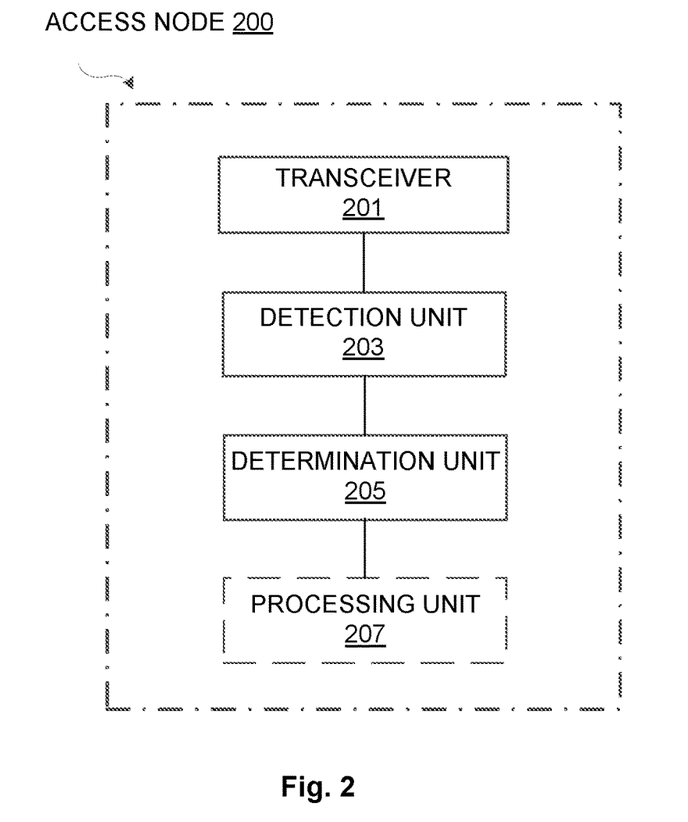
FIG. 2 illustratively shows a schematic structure diagram of an access node according to an embodiment of the present disclosure.

Hereinafter, a structure of an access node will be described with reference to FIG. 2. FIG. 2 illustratively shows a schematic structure diagram of an access node according to an embodiment of the present disclosure. The access node 200 in FIG. 2 may perform the method 100 described previously with reference to FIG. 1.

As shown in FIG. 2, the access node 200 comprises a transceiver 201, a detection unit 203 and a determination unit 205.

In particular, the transceiver 201 is configured to transmit in step S101, to a UE, an UL grant and a DL assignment in a same DL subframe.

As previously described, in another embodiment, the transceiver 201 may be configured to transmit in step S101, to the UE, the UL grant and the DL assignment on DL physical resources which experience substantially identical channel conditions.

In yet another embodiment, the transceiver 201 may be configured to transmit in step S101, to the UE, the UL grant and the DL assignment on same DL physical resources.

The detection unit 203 is configured to detect, in step S103, whether DTX of at least one of (1) UL data to be transmitted in response to the UL grant received by the UE and (2) HARQ ACK/NACK to be transmitted in response to DL data related to the DL assignment received by the UE occurs.

The determination unit 205 is configured to determine, in step S105, a cause of the DTX based on a result of the DTX detection from the detection unit 203.

As previously discussed, in a case that the UE supports simultaneous transmissions on an UL shared channel and on an UL control channel, e.g., the UE is configured for simultaneous PUSCH and PUCCH transmissions, the UL shared channel (e.g. PUSCH) allows transmission of the UL data and the UL control channel (e.g. PUCCH) allows transmission of the HARQ ACK/NACK. In this case, if the UE is a legacy UE which was obliged to transmit on granted UL shared channel even when it had not enough data in the UL buffer of the UE where padding data are transmitted, the determination unit 203 of the access node 200 is particularly configured to:

A) responsive to detecting, by the detection unit 203, that the DTX of both the UL data and the HARQ ACK/NACK occurs, determine that the DTX is caused by a DL problem in which neither the UL grant nor the DL assignment transmitted in the same DL subframe is detected by the UE;

B) responsive to detecting, by the detection unit 203, that the DTX of only the UL data occurs, determine that the DTX is caused by a UL problem in which the UL shared channel is too weak;

C) responsive to detecting, by the detection unit 203, that the DTX of only the HARQ ACK/NACK occurs, determine that the DTX is caused by a UL problem in which the UL control channel is too weak.

Accordingly, the access node may further comprise a processing unit 207, which takes a corresponding action in regard of the UL and/or DL based on the cause of the DTX determined by the determination unit 205 in step S107.

Relationships between combined DTX detection results of the detection unit 203 and DTX causes determined by the determination unit 203 as well as actions suggested to be performed by the processing unit 207 are outlined in Table 1 as previously presented.

In another embodiment, in a case that the UE supports the simultaneous transmissions on an UL shared channel and on an UL control channel, e.g., the UE is configured for simultaneous PUSCH and PUCCH transmissions, the UL shared channel (e.g. PUSCH) allows transmission of the UL data and the UL control channel (e.g. PUCCH) allows transmission of the HARQ ACK/NACK. Further, in a case that the UE is allowed to not transmit padding data if there is no data in an UL buffer, i.e., the UE is a skipPadding UE as previously mentioned for which a skipPadding bit is set, the determination unit 203 of the access node 200 is configured to:

A') responsive to detecting, by the detection unit 203, that the DTX of both the UL data and the HARQ ACK/NACK occurs, determine that the DTX is caused by a DL problem in which neither the UL grant nor the DL assignment transmitted in the same DL subframe is detected by the UE;

D) responsive to detecting, by the detection unit 203, that the DTX of only the UL data occurs, determine that the DTX is caused due to no data in the UL buffer to be transmitted by the UE or the UL shared channel is too weak;

C') responsive to detecting, by the detection unit 203, that the DTX of only the HARQ ACK/NACK occurs, determine that the DTX is caused by a UL problem in which the UL control channel is too weak.

Accordingly, the processing unit 207 takes a corresponding action in regard of the UL and/or DL based on the cause of the DTX determined by the determination unit 205 in step S107.

Relationships between combined DTX detection results of the detection unit 203 and DTX causes determined by the determination unit 203 as well as actions suggested to be performed by the processing unit 207 are outlined in Table 2 as previously presented.

In yet another embodiment, in a case that the UE does not support the simultaneous transmissions on the UL shared channel and on the UL control channel, e.g., the UE is not configured for simultaneous PUSCH and PUCCH transmissions, the UL shared channel (e.g. PUSCH) allows transmission of the UL data; the HARQ ACK/NACK is allowed to be transmitted on the UL shared channel (e.g. PUSCH) by multiplexing with the UL data if there are data to be transmitted on the UL shared channel (e.g. PUSCH), and the HARQ ACK/NACK is allowed to be transmitted on the UL control channel (e.g. PUCCH), if there is no data to be transmitted on the UL shared channel (e.g. PUSCH). Further, in a case that the UE is allowed to not transmit padding data if there is no data in the UL buffer, i.e., the UE is the skipPadding UE, the determination unit 203 is configured to:

E) responsive to detecting, by the detection unit 203, that the DTX of the UL data and the HARQ ACK/NACK on both the UL shared channel and the UL control channel occurs, determine that the DTX is caused by a DL problem in which neither the UL grant nor the DL assignment transmitted in the same DL subframe is detected by the UE;

F) responsive to detecting, by the detection unit 203, that the DTX of both the UL data and the HARQ ACK/NACK on the UL shared channel occurs, determine that the DTX is caused due to no data in the UL buffer to be transmitted by the UE;

G) responsive to detecting, by the detection unit 203, that the DTX of the HARQ ACK/NACK on both the UL shared channel and the UL control channel occurs, determine that the DTX is caused by a UL problem in which the UL shared channel is too weak.

Accordingly, the processing unit 207 takes a corresponding action in regard of the UL and/or DL based on the cause of the DTX determined by the determination unit 205 in step S107.

Relationships between combined DTX detection results of the detection unit 203 and DTX causes determined by the determination unit 203 as well as actions suggested to be performed by the processing unit 207 are outlined in Table 3 as previously presented.

Figure 3:
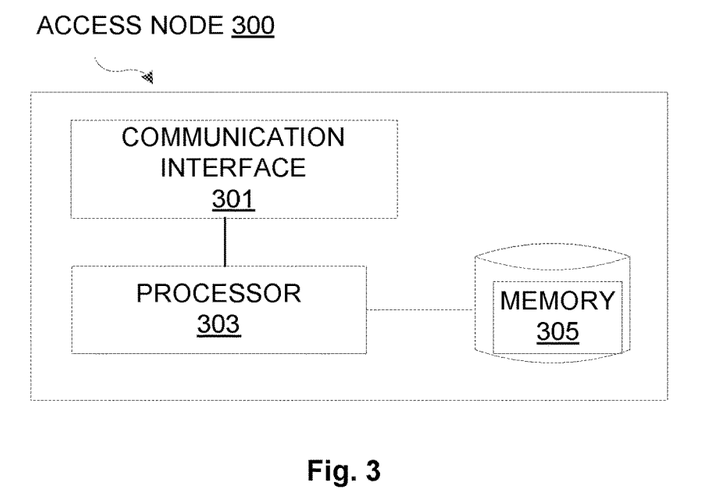
FIG. 3 illustratively shows a schematic structure diagram of an access node according to another embodiment of the present disclosure.

Hereinafter, another structure of an access node will be described with reference to FIG. 3. FIG. 3 illustratively shows a schematic structure diagram of an access node according to another embodiment of the present disclosure. The access node 300 in FIG. 3 may perform the method 300 described previously with reference to FIG. 1.

As shown in FIG. 3, the access node 300 comprises at least one controller or processor 303 comprising e.g., any suitable Central Processing Unit, CPU, microcontroller, Digital Signal Processor, DSP, etc., capable of executing computer program code. The computer program code may be stored in a memory 305. The memory 305 may be any combination of a RAM (Read And Write Memory) and a ROM (Read Only Memory). The memory may also comprise persistent storage, which, for example, can be any single one or combination of magnetic memory, optical memory, or solid state memory or even remotely mounted memory. The example access node 300 further comprises a communication interface 301 arranged for wireless communication with other devices or nodes, such as a UE served by the access node.

The computer program code, when loaded from the memory 305 and run in the processor 303, causes access node 300 to perform the methods according to the disclosure, such as the method 100 as previously described. In an embodiment, the computer program code, when executed, cause access node 300 to transmit, via the communication interface 301, to a UE, an UL grant and a DL assignment in a same DL subframe; detect whether DTX of at least one of 1) UL data to be transmitted in response to the UL grant received by the UE, and 2) HARQ ACK/NACK to be transmitted in response to DL data related to the DL assignment received by the UE occurs; and determine a cause of the DTX based on a result of the DTX detection.

The foregoing embodiments of the disclosure may achieve one or more of the following advantages.

By transmitting both the UL grant and the DL assignment to the UE in the same DL subframe, combined feedback information related to the UL data to be transmitted in response to the UL grant and the HARQ ACK/NACK to be transmitted in response to the DL data related to the DL assignment can be received by the access node from the UE, so as to improve the DTX robustness scheme in the conventional technical solutions in which the UL grant and the DL assignment are signaled independent to each other and only feedback information related to either the UL data or the HARQ ACK/NACK can be received.

Additionally, if the UL grant and the DL assignment are transmitted on separate DL physical resources, the DL physical resources for the UL grant and the DL physical resources for the DL assignment may require separate two CRCs (Cycle Redundancy Check), which may cause the DL physical resource utilization inefficiency. By transmitting both the UL grant and the DL assignment the UE on the same DL physical resources, the DL control channel, e.g.

PDCCH/EPDCCH, physical resources may be saved by saving some coded DCI (DL Control Information) bits (e.g. only one CRC required and 16 bits saved), compared to the case in which the UL grant and the DL assignment are signaled on separate DL physical resources.

The foregoing description of implementations provides illustration and description, but is not intended to be exhaustive or to limit the disclosure to the precise form disclosed. Modifications and variations are possible in light of the above teachings, or may be acquired from practice of the disclosure.

Aspects of the disclosure may also be embodied as methods and/or computer program products. Accordingly, the disclosure may be embodied in hardware and/or in hardware/software (including firmware, resident software, microcode, etc.). Furthermore, the embodiments may take the form of a computer program product on a computer-usable or computer-readable storage medium having computer-usable or computer-readable program code embodied in the medium for use by or in connection with an instruction execution system. Such instruction execution system may be implemented in a standalone or distributed manner. The actual software code or specialized control hardware used to implement embodiments described herein is not limiting of the disclosure. Thus, the operation and behavior of the aspects were described without reference to the specific software code, it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

The invention claimed is:

1. A method at an access node, comprising:
   transmitting, to a user equipment, UE, an uplink, UL, grant and a downlink, DL, assignment in a same DL subframe;
   detecting whether discontinuous transmission, DTX, of at least one of 1) UL data to be transmitted in response to the UL grant received by the UE, and 2) Hybrid Automatic Repeat Request, HARQ, ACK/NACK to be transmitted in response to DL data related to the DL assignment received by the UE occurs; and
   determining a cause of the DTX based on a result of the DTX detection,
   wherein in a case that the UE supports simultaneous transmissions on an UL shared channel and on an UL control channel, the UL shared channel allows transmission of the UL data and the UL control channel allows transmission of the HARQ ACK/NACK, and
   wherein the step of determining comprises:
      responsive to detecting that the DTX of both the UL data and the HARQ ACK/NACK occurs, determining that the DTX is caused by a DL problem in which neither the UL grant nor the DL assignment transmitted in the same DL subframe is detected by the UE;
      responsive to detecting that the DTX of only the UL data occurs, determining that the DTX is caused by a UL problem in which the UL shared channel is too weak;
      responsive to detecting that the DTX of only the HARQ ACK/NACK occurs, determining that the DTX is caused by a UL problem in which the UL control channel is too weak.

2. The method of claim 1, further comprising taking a corresponding action in regard of the UL and/or DL based on the determined cause of the DTX.

3. The method according to claim 1, wherein in a case that the UE is allowed to not transmit padding data if there is no data in an UL buffer, the step of determining comprises:
   responsive to detecting that the DTX of both the UL data and the HARQ ACK/NACK occurs, determining that the DTX is caused by a DL problem in which neither the UL grant nor the DL assignment transmitted in the same DL subframe is detected by the UE;
   responsive to detecting that the DTX of only the UL data occurs, determining that the DTX is caused due to no data in the UL buffer to be transmitted by the UE or the UL shared channel is too weak;
   responsive to detecting that the DTX of only the HARQ ACK/NACK occurs, determining that the DTX is caused by a UL problem in which the UL control channel is too weak.

4. The method according to claim 1, wherein in a case that the UE does not support simultaneous transmissions on an UL shared channel and on an UL control channel, the UL shared channel allows transmission of the UL data, the HARQ ACK/NACK is allowed to be transmitted on the UL shared channel by multiplexing with the UL data if there are data to be transmitted on the UL shared channel, and the HARQ ACK/NACK is allowed to be transmitted on the UL control channel if there is no data to be transmitted on the UL shared channel.

5. The method according to claim 4, wherein in a case that the UE is allowed to not transmit padding data if there is no data in an UL buffer, the step of determining comprises:
   responsive to detecting that the DTX of the UL data and the HARQ ACK/NACK on both the UL shared channel and the UL control channel occurs, determining that the DTX is caused by a DL problem in which neither the UL grant nor the DL assignment transmitted in the same DL subframe is detected by the UE;
   responsive to detecting that the DTX of both the UL data and the HARQ ACK/NACK on the UL shared channel occurs, determining that the DTX is caused due to no data in the UL buffer to be transmitted by the UE;
   responsive to detecting that the DTX of the HARQ ACK/NACK on both the UL shared channel and the UL control channel occurs, determining that the DTX is caused by a UL problem in which the UL shared channel is too weak.

6. The method according to claim 1, wherein the UL grant and the DL assignment are transmitted to the UE on DL physical resources which experience substantially identical channel conditions.

7. The method according to claim 1, wherein the UL grant and the DL assignment are transmitted to the UE on same DL physical resources.

8. An access node, comprising:
a transceiver, configured to transmit, to a user equipment, UE, an uplink, UL, grant and a downlink, DL, assignment in a same DL subframe;
a detection unit, configured to detect whether discontinuous transmission, DTX, of at least one of 1) UL data to be transmitted in response to the UL grant received by the UE, and 2) Hybrid Automatic Repeat Request, HARQ, ACK/NACK to be transmitted in response to DL data related to the DL assignment received by the UE occurs; and
a determination unit, configured to determine a cause of the DTX based on a result of the DTX detection,
wherein in a case that the UE supports simultaneous transmissions on an UL shared channel and on an UL control channel, the UL shared channel allows transmission of the UL data and the UL control channel allows transmission of the HARQ ACK/NACK,
wherein the determination unit is further configured to:
responsive to detecting, by the detection unit, that the DTX of both the UL data and the HARQ ACK/NACK occurs, determine that the DTX is caused by a DL problem in which neither the UL grant nor the DL assignment transmitted in the same DL subframe is detected by the UE;
responsive to detecting, by the detection unit, that the DTX of only the UL data occurs, determine that the DTX is caused by a UL problem in which the UL shared channel is too weak;
responsive to detecting, by the detection unit, that the DTX of only the HARQ ACK/NACK occurs, determine that the DTX is caused by a UL problem in which the UL control channel is too weak.

9. The access node according to claim 8, further comprising:
a processing unit, configured to take a corresponding action in regard of the UL and/or DL based on the determined cause of the DTX.

10. The access node according to claim 8, wherein in a case that the UE is allowed to not transmit padding data if there is no data in an UL buffer, the determination unit is configured to:
responsive to detecting, by the detection unit, that the DTX of both the UL data and the HARQ ACK/NACK occurs, determine that the DTX is caused by a DL problem in which neither the UL grant nor the DL assignment transmitted in the same DL subframe is detected by the UE;
responsive to detecting, by the detection unit, that the DTX of only the UL data occurs, determine that the DTX is caused due to no data in the UL buffer to be transmitted by the UE or the UL shared channel is too weak; responsive to detecting, by the detection unit, that the DTX of only the HARQ ACK/NACK occurs, determine that the DTX is caused by a UL problem in which the UL control channel is too weak.

11. The access node according to claim 8, wherein in a case that the UE does not support simultaneous transmissions on an UL shared channel and on an UL control channel, the UL shared channel allows transmission of the UL data; the HARQ ACK/NACK is allowed to be transmitted on the UL shared channel by multiplexing with the UL data if there are data to be transmitted on the UL shared channel, and the HARQ ACK/NACK is allowed to be transmitted on the UL control channel if there is no data to be transmitted on the UL shared channel.

12. The access node according to claim 11, wherein in a case that the UE is allowed to not transmit padding data if there is no data in an UL buffer, the determination unit is configured to:
responsive to detecting, by the detection unit, that the DTX of the UL data and the HARQ ACK/NACK on both the UL shared channel and the UL control channel occurs, determine that the DTX is caused by a DL problem in which neither the UL grant nor the DL assignment transmitted in the same DL subframe is detected by the UE;
responsive to detecting, by the detection unit, that the DTX of both the UL data and the HARQ ACK/NACK on the UL shared channel occurs, determine that the DTX is caused due to no data in the UL buffer to be transmitted by the UE;
responsive to detecting, by the detection unit, that the DTX of the HARQ ACK/NACK on both the UL shared channel and the UL control channel occurs, determine that the DTX is caused by a UL problem in which the UL shared channel is too weak.

13. The access node according to claim 8, wherein the UL grant and the DL assignment are transmitted to the UE on DL physical resources which experience substantially identical channel conditions.

14. The access node according to claim 8, wherein the UL grant and the DL assignment are transmitted to the UE on same DL physical resources.

15. An access node, comprising:
a communication interface arranged for wireless communication, at least one processor, and
a memory including instructions which, when executed by said at least one processor, cause said access node to:
transmit, via the communication interface, to a user equipment, UE, an uplink, UL, grant and a downlink, DL, assignment in a same DL subframe;
detect whether discontinuous transmission, DTX, of at least one of 1) UL data to be transmitted in response to the UL grant received by the UE, and 2) Hybrid Automatic Repeat Request, HARQ, ACK/NACK to be transmitted in response to DL data related to the DL assignment received by the UE occurs; and
determine a cause of the DTX based on a result of the DTX detection,
wherein in a case that the UE supports simultaneous transmissions on an UL shared channel and on an UL control channel, the UL shared channel allows transmission of the UL data and the UL control channel allows transmission of the HARQ ACK/NACK,
wherein the memory further includes instructions which, when executed by said at least one processor, cause the access node to:
responsive to detecting that the DTX of both the UL data and the HARQ ACK/NACK occurs, determine that the DTX is caused by a DL problem in which neither the UL grant nor the DL assignment transmitted in the same DL subframe is detected by the UE;

responsive to detecting that the DTX of only the UL data occurs, determine that the DTX is caused by a UL problem in which the UL shared channel is too weak;

responsive to detecting that the DTX of only the HARQ ACK/NACK occurs, determine that the DTX is caused by a UL problem in which the UL control channel is too weak.

16. The access node according to claim 15, wherein the memory further includes instructions which, when executed by said at least one processor, cause said access node to take a corresponding action in regard of the UL and/or DL based on the determined cause of the DTX.

17. The access node according to claim 15, wherein the memory further includes instructions which, when executed by said at least one processor, cause the access node to, in a case that the UE is allowed to not transmit padding data if there is no data in an UL buffer:

responsive to detecting that the DTX of both the UL data and the HARQ ACK/NACK occurs, determine that the DTX is caused by a DL problem in which neither the UL grant nor the DL assignment transmitted in the same DL subframe is detected by the UE;

responsive to detecting that the DTX of only the UL data occurs, determine that the DTX is caused due to no data in the UL buffer to be transmitted by the UE or the UL shared channel is too weak;

responsive to detecting that the DTX of only the HARQ ACK/NACK occurs, determine that the DTX is caused by a UL problem in which the UL control channel is too weak.

18. The access node according to claim 15, wherein in a case that the UE does not support simultaneous transmissions on an UL shared channel and on an UL control channel, the UL shared channel allows transmission of the UL data; the HARQ ACK/NACK is allowed to be transmitted on the UL shared channel by multiplexing with the UL data if there are data to be transmitted on the UL shared channel, and the HARQ ACK/NACK is allowed to be transmitted on the UL control channel if there is no data to be transmitted on the UL shared channel.

19. The access node according to claim 18, wherein in a case that the UE is allowed to not transmit padding data if there is no data in an UL buffer, the memory further includes instructions which, when executed by said at least one processor, cause the access node to:

responsive to detecting that the DTX of the UL data and the HARQ ACK/NACK on both the UL shared channel and the UL control channel occurs, determine that the DTX is caused by a DL problem in which neither the UL grant nor the DL assignment transmitted in the same DL subframe is detected by the UE;

responsive to detecting that the DTX of both the UL data and the HARQ ACK/NACK on the UL shared channel occurs, determine that the DTX is caused due to no data in the UL buffer to be transmitted by the UE;

responsive to detecting that the DTX of the HARQ ACK/NACK on both the UL shared channel and the UL control channel occurs, determine that the DTX is caused by a UL problem in which the UL shared channel is too weak.

20. The access node according to claim 15, wherein the UL grant and the DL assignment are transmitted to the UE on DL physical resources which experience substantially identical channel conditions.

21. The access node according to claim 15, wherein the UL grant and the DL assignment are transmitted to the UE on same DL physical resources.

22. The access node according to claim 8, wherein the access node is an eNodeB.

23. A non-transitory computer-readable storage medium comprising a computer program product including instructions to cause at least one processor to:

transmit, to a user equipment, UE, an uplink, UL, grant and a downlink, DL, assignment in a same DL subframe;

detect whether discontinuous transmission, DTX, of at least one of UL data to be transmitted in response to the UL grant received by the UE, and Hybrid Automatic Repeat Request, HARQ, ACK/NACK to be transmitted in response to DL data related to the DL assignment received by the UE occurs; and determine a cause of the DTX based on a result of the DTX detection, wherein in a case that the UE supports simultaneous transmissions on an UL shared channel and on an UL control channel, the UL shared channel allows transmission of the UL data and the UL control channel allows transmission of the HARQ ACK/NACK, wherein the at least one processor is further configured to:

responsive to detecting that the DTX of both the UL data and the HARQ ACK/NACK occurs, determine that the DTX is caused by a DL problem in which neither the UL grant nor the DL assignment transmitted in the same DL subframe is detected by the UE;

responsive to detecting that the DTX of only the UL data occurs, determine that the DTX is caused by a UL problem in which the UL shared channel is too weak;

responsive to detecting that the DTX of only the HARQ ACK/NACK occurs, determine that the DTX is caused by a UL problem in which the UL control channel is too weak.

* * * * *